(12) United States Patent
Lin (10) Patent No.: US 10,564,413 B2
(45) Date of Patent: Feb. 18, 2020

(54) MIRROR DISPLAY APPARATUS

(71) Applicant: BOE TECHNOLOGY GROUP CO., LTD., Beijing (CN)

(72) Inventor: She Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 31 days.

(21) Appl. No.: 15/525,648

(22) PCT Filed: Jul. 11, 2016

(86) PCT No.: PCT/CN2016/089642
§ 371 (c)(1),
(2) Date: May 10, 2017

(87) PCT Pub. No.: WO2017/148066
PCT Pub. Date: Sep. 8, 2017

(65) Prior Publication Data
US 2018/0095326 A1  Apr. 5, 2018

(30) Foreign Application Priority Data

Mar. 3, 2016 (CN) .......................... 2016 1 0120915

(51) Int. Cl.
*G02B 26/00* (2006.01)
*G02B 26/02* (2006.01)
(Continued)

(52) U.S. Cl.
CPC ............. *G02B 26/007* (2013.01); *G02B 5/08* (2013.01); *G02B 26/026* (2013.01); *G02B 26/04* (2013.01)

(58) Field of Classification Search
None
See application file for complete search history.

(56) References Cited

U.S. PATENT DOCUMENTS

2010/0097580 A1* 4/2010 Yamamoto ........... G02B 26/101
353/69
2011/0056102 A1 3/2011 Reid et al.
(Continued)

FOREIGN PATENT DOCUMENTS

CN   201465477   5/2010
CN   101791182   8/2010
(Continued)

OTHER PUBLICATIONS

International Search Report from corresponding PCT Application No. PCT/CN2016/089642 dated Nov. 28, 2016 (5 pages).
(Continued)

*Primary Examiner* — Darryl J Collins
*Assistant Examiner* — Journey F Sumlar
(74) *Attorney, Agent, or Firm* — Dave Law Group LLC; Raj S. Dave (57) ABSTRACT

The present disclosure discloses a mirror display apparatus and a corresponding method, the apparatus including a mirror display unit configured both to display an information image and as a mirror, a detection unit configured to detect a first area in the mirror display unit corresponding to a human body in front of the mirror display unit and a processing unit configured to adjust a position of a second area for displaying an information image in the mirror display unit in response to the detection of the first area by the detection unit, such that the second area is outside the first area.

20 Claims, 5 Drawing Sheets

(51) Int. Cl.
    *G02B 26/04*    (2006.01)
    *G02B 5/08*     (2006.01)

(56) References Cited

U.S. PATENT DOCUMENTS

2013/0176248 A1    7/2013   Shin et al.
2016/0004325 A1*   1/2016   Roe .................. G06F 3/0237
                                                         345/168

FOREIGN PATENT DOCUMENTS

| CN | 201877096 | 6/2011 |
| CN | 102610176 | 7/2012 |
| CN | 103197879 | 7/2013 |
| CN | 103455212 | 12/2013 |
| CN | 204245757 | 4/2015 |
| CN | 105551380 | 5/2016 |
| KR | 202008002116 | 6/2008 |
| WO | 2008099301 | 8/2008 |
| WO | WO2013118205 A * | 8/2013 |
| WO | 2013180651 | 12/2013 |

OTHER PUBLICATIONS

Written Opinion from corresponding PCT Application No. PCT/CN2016/089642 dated Nov. 28, 2016 (5 pages).
Office Action from corresponding Chinese Application No. 201610120915.5 dated Sep. 22, 2017 (7 pages).

\* cited by examiner

MIRROR DISPLAY APPARATUS

TECHNICAL FIELD

Embodiments of the present disclosure relate to the display technology, and in particular to a mirror display apparatus and method.

BACKGROUND

The mirror display apparatus is a novel display device which can both display an image and reflect a scene for use as a mirror. The information image display position of the conventional mirror display apparatus is fixed. Usually when it is not used to display an image, you can use its reflection function to look in the mirror; and when using its reflection function to look in the mirror, you need to turn off its display function. Alternatively, the mirror display apparatus may simultaneously display an image and reflect a scene, but this may cause interference between the displayed image and the reflection. So the existing mirror display apparatus is not easy to use, and its experience is not very good.

It can be seen that there is a need in the art for an improved mirror display solution.

SUMMARY

In one aspect of the present disclosure, there is provided a mirror display apparatus comprising:

a mirror display unit configured both to display an information image and as a mirror;

a detection unit configured to detect a first area in the mirror display unit corresponding to a human body in front of the mirror display unit; and a processing unit configured to adjust a position of a second area for displaying an information image in the mirror display unit in response to the detection of the first area by the detection unit, so that the second area is located outside the first area.

According to an exemplary embodiment of the present disclosure, the processing unit is further configured to adjust a size and/or shape of the second area in response to the detection of the first area by the detection unit, so that the second area is located outside the first area.

According to a further exemplary embodiment of the present disclosure, the processing unit is further configured to transfer the information image originally displayed in the second area at a position of the first area to the adjusted second area for display, and to cause the first area to be used as a mirror, in response to the detection of the first area by the detection unit.

According to still another further exemplary embodiment of the present disclosure, the processing unit is further configured to close the display of the information image originally displayed in the second area at a position of the first area, and to cause the first area to be used as a mirror, in response to the detection of the first area by the detection unit.

According to a further exemplary embodiment of the present disclosure, the processing unit is further configured to adjust the position, size and/or shape of the second area such that the second area surrounds the first area.

According to a further exemplary embodiment of the disclosure, the processing unit is further configured to adjust the position, size and/or shape of the second area such that the second area occupies a maximum space other than the first area According to an exemplary embodiment of the present disclosure, the processing unit is further configured to adjust the number of the second areas in response to the detection of the first area by the detection unit, so that the second areas are located outside the first area.

According to an exemplary embodiment of the present disclosure, the detection unit includes an infrared detection unit.

According to an exemplary embodiment of the present disclosure, the detection unit includes a dual camera detection unit.

In another aspect of the present disclosure, there is provided a mirror display method, comprising:

detecting a first area in a mirror display unit corresponding to a human body in front of the mirror display unit, wherein the mirror display unit is configured both to display an information image and as a mirror; and in response to the detection of the first area, adjusting a position of a second area for displaying an information image in the mirror display unit so that the second area is outside the first area.

According to an exemplary embodiment of the present disclosure, the method further comprises adjusting the size and/or shape of the second area in response to the detection of the second area such that the second area is located outside the first area.

According to a further exemplary embodiment of the present disclosure, the method further comprises, in response to the detection of the first area, transferring the information image originally displayed in the second area of at a position of the first area to the adjusted second area for display, and causing the first area to be used as a mirror.

According to another further exemplary embodiment of the present disclosure, the method further comprises, in response to the detection of the first area, closing the display of the information image originally displayed in the second area at a position of the first area, and causing the first area to be used as a mirror.

According to a further exemplary embodiment of the present disclosure, the adjusting a position, size and/or shape of the second area such that the second area is located outside the first area comprises adjusting the position, size and/or shape of the second area such that the second area surrounds the first area.

A further exemplary embodiment of the present disclosure, wherein the adjusting a position, size and/or shape of the second area such that the second area is located outside the first area comprises, in response to the detection of a first area, adjusting a position, size and/or shape of the second area such that the second area occupies a maximum space outside the first area.

In an exemplary embodiment of the present disclosure, the method further comprises, in response to the detection of the first area, adjusting the number of the second areas such that the second areas are outside the first area.

According to an exemplary embodiment of the present disclosure, the detecting step and the adjusting step are continuously performed.

The technical solution of embodiments of the present disclosure allows the mirror display apparatus to display the information contents while a user is using it as a mirror, without interfering with each other, thereby enhancing the actual use experience of the mirror display apparatus.

DETAILED DESCRIPTION OF SPECIFIC EMBODIMENTS

In order to provide a better understanding of the solution of the present disclosure by those skilled in the art, the mirror display apparatus and method provided in embodiments of the present disclosure will be described in further detail with reference to the accompanying drawings and specific embodiments. Obviously, the described embodiments are some embodiments of the present disclosure, not all embodiments thereof. All other embodiments obtained by one of ordinary skill in the art based on the described embodiments of the disclosure without the need for creative work are within the scope of the present disclosure.

Figure 1:
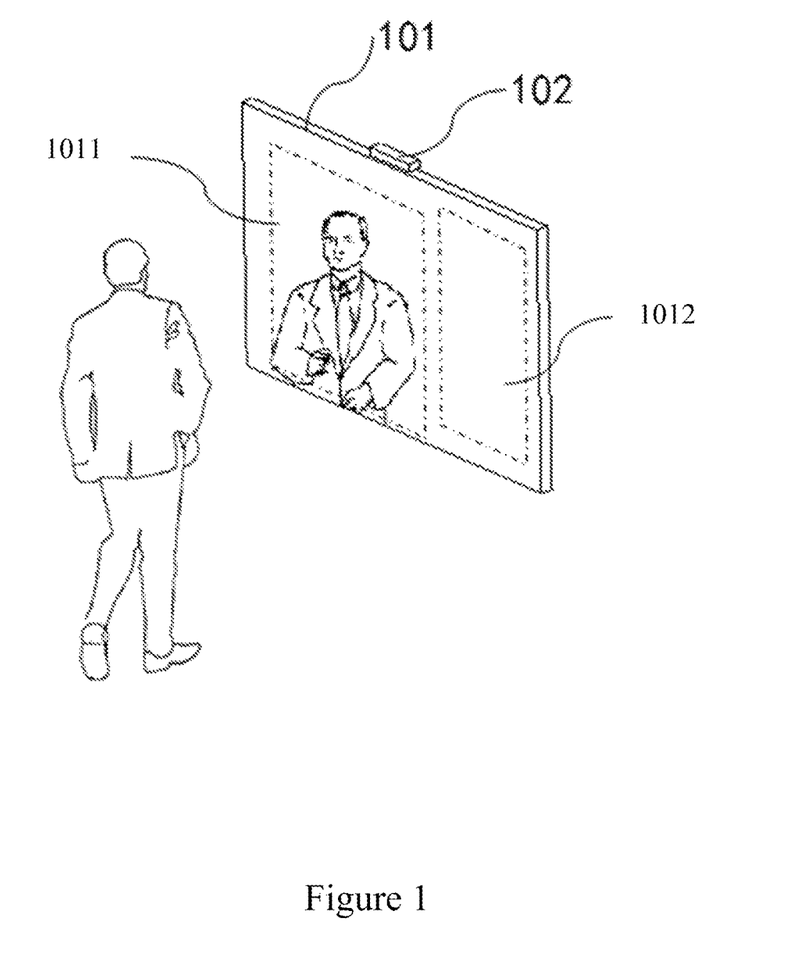
FIG. 1 shows a system schematic diagram of a mirror display solution according to an embodiment of the present disclosure.
Figure 2:
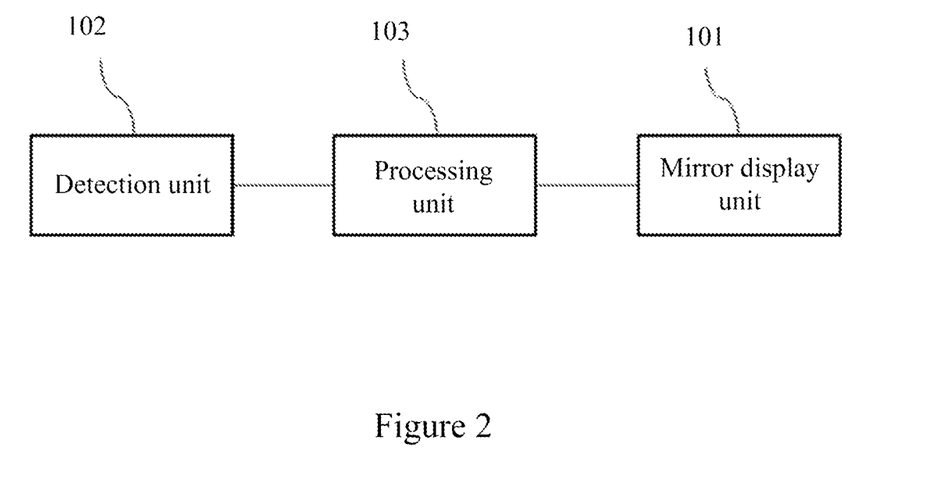
FIG. 2 shows a schematic block diagram of a mirror display apparatus according to an embodiment of the present disclosure.

Now referring to the drawings, FIG. 1 shows a system schematic diagram of a mirror display solution according to an embodiment of the present disclosure, and FIG. 2 shows a schematic block diagram of a mirror display apparatus according to an embodiment of the present disclosure.

As shown in FIG. 1 and FIG. 2, a mirror display apparatus according to an embodiment of the present disclosure includes a mirror display unit 101, a detection unit 102, and a processing unit 103.

The mirror display unit 101 can be used both for displaying an information image and as a mirror. A first area 1011 of the mirror display unit 101 serving as a mirror and a second area 1012 for displaying an information image are shown in FIG. 1. The positions of the first area 1011 and the second area 1012 may be adjustable and, optionally, their sizes and/or shapes may also be adjustable. Optionally, the entire screen of the mirror display unit 101 may be used as a mirror, and may also be used to display an information image.

The detection unit 102 is for detecting the first area 1011 in the mirror display unit 101 corresponding to a human body in front of the mirror display unit 101. The area 1011 may be an area in the mirror display unit used by the person when the mirror display unit 101 is used as a mirror. The detection unit 102 may be any detection unit capable of detecting the presence, position, and corresponding area of a human body, such as an infrared detection unit, a dual camera detection unit, and the like. The detection unit 102 may be mounted above the mirror display unit 101 as shown in FIG. 1, or any other location suitable for detecting an area corresponding to a human body in front of the mirror display unit 101.

The processing unit 103 is configured to adjust the position of the second area 1012 for displaying an information image in the mirror display unit 101 in response to the detection of the first area 1011 by the detection unit 102 so that the second area 1012 is located outside the first area 1011. In this way, the mutual interference between the information image display and the mirror function of the mirror display unit 101 is avoided, and the user experience is improved. It is to be understood that the expression "the second area 1012 is located outside the first area 1011" can be construed as: at any particular moment, the first area 1011 and the second area 1012 do not overlap (but at a next moment, as a different first area 1011 may be detected by the processing unit 103, the first area 1011 and the second area 1012 will be changed accordingly, see below).

The processing unit 103 may be electrically connected to the detection unit 102 and the mirror display unit 101 so as to receive a signal from the detection unit 102 of detecting a first area 1011 corresponding to a human body and send an instruction to the mirror display unit 101 to adjust the location of the second area 1012. The processing unit 103 may be any general or dedicated processing device and may preferably include processor hardware and software for programming the hardware to perform the corresponding functions.

According to an exemplary embodiment of the present disclosure, the processing unit 103 not only may adjust the position of the second area 1012 in response to the detection of the first area 1011 by the detection unit 102, but also may adjust the size and/or shape of the second area 1012 such that the second area 1012 is located outside the first area 1011. For example, the processing unit 103 may adjust the position, size and/or shape of the second area 1012 such that the second area 1012 surrounds the first area 1011.

According to a first further exemplary embodiment of the present disclosure, the processing unit 103 is further configured to transfer an information image (the contents at a first time) displayed in the second area 1012 originally at the position of the first area 1011 (the position at a second time) to the adjusted second area 1012 (the position at the second time) for display, and the first area 1011 (at the position at the second time) is used as a mirror, in response to the detection of the first area 1011 (at the second time) by the detection unit 102. That is, after the processing unit 103 detects the first area 1011, in addition to adjusting the position, size and/or shape of the second area 1012 accordingly so that the second area 1012 is located outside the first area 1011, it also transfers the information image originally displayed in the second area 1012 at the position of the first area 1011 to the adjusted second area 1012 for display so that the display of the information image displayed in the second area originally located at the position of the first area 1011 is not interrupted.

According to a second further exemplary embodiment of the present disclosure, the processing unit 103 is further configured to close the display of the information image (the contents at a first time) originally displayed in the second area 1022 at the position of the first area 1011 (the position at the second time), and to cause the first area 1011 (the position at the second time) to be used as a mirror, in response to the detection of the first area 1011 (at the second time) by the detection unit 102. That is, after the processing unit 103 detects the first area 1011, apart from adjusting the position, size and/or shape of the second area 1012 accordingly so that the second area 1012 is located outside the first area 1011, the information image originally displayed in the second area 1012 at the position of the first area 1011 is no longer displayed, instead of transferring the information image to another location of the second area 1012, so as not to affect the display of the information originally displayed in the second area 1012 outside the first area 1011. In this way, for example, when the user moves in front of the mirror display unit, the detected position of the first area 1011 is constantly changed, and the information image originally displayed at the position of a new first area 1011 is continuously closed, and the information image in the second area 1012 outside the first area 1011 remains displayed or the display thereof is continuously restored.

Figure 3A:
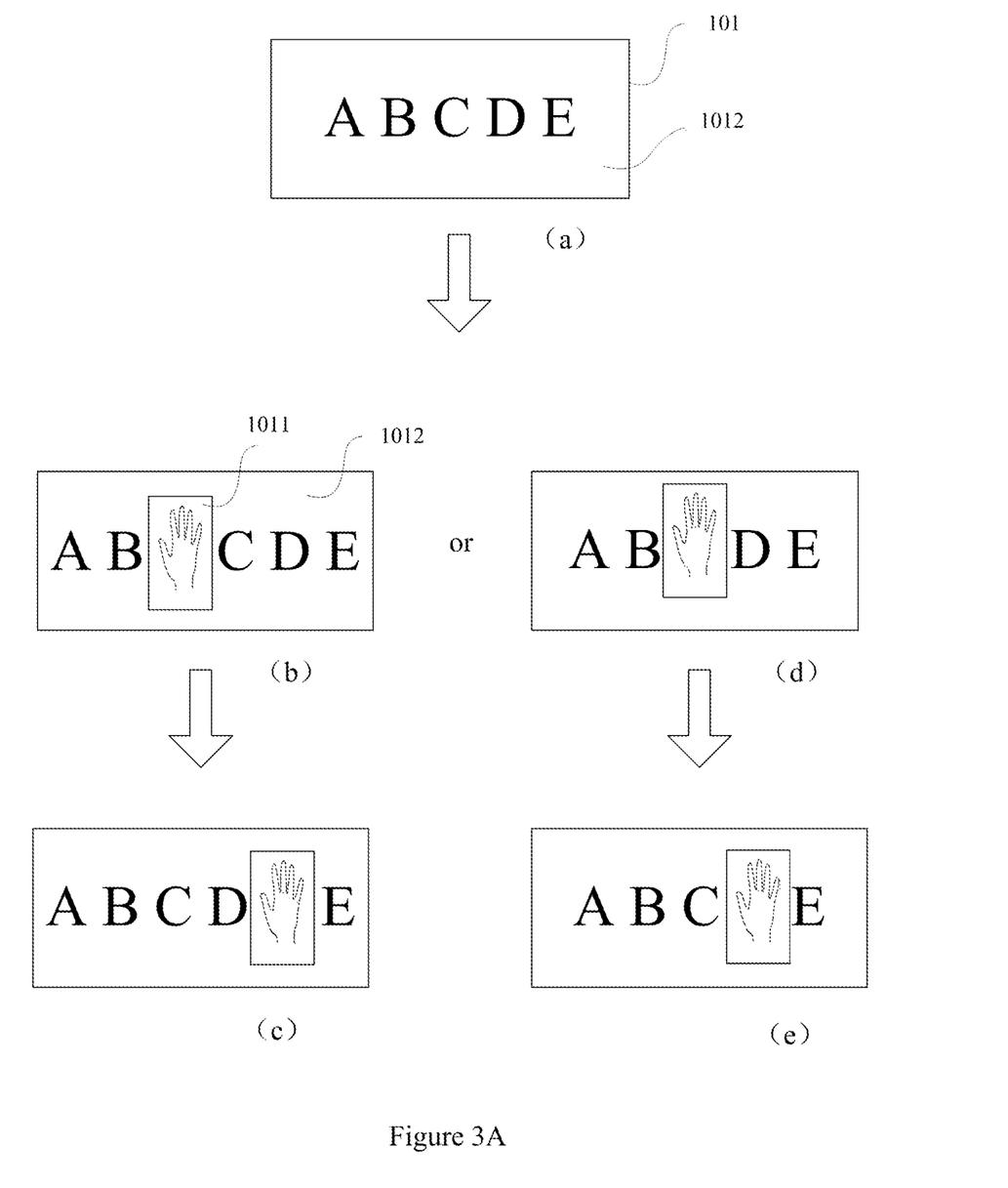
FIGS. 3A and 3B schematically illustrate use scenarios of a mirror display apparatus according to two exemplary embodiments of the present disclosure.
Figure 3B:
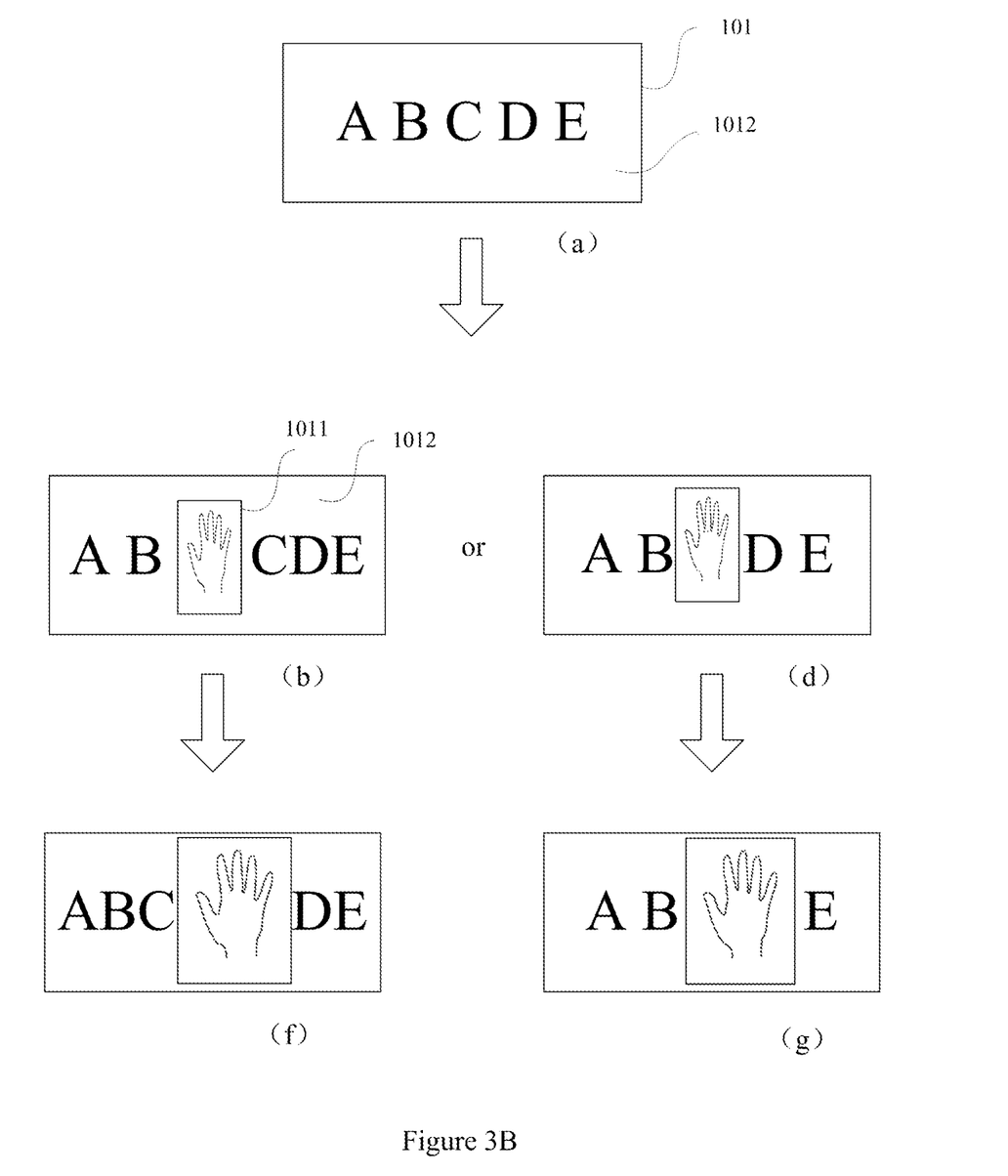

FIGS. 3A and 3B schematically illustrate use scenarios of a mirror display apparatus according to the two further exemplary embodiments described above. FIG. 3A includes five subfigures, (a), (b), (c), (d) and (e), wherein subfigure (a) schematically shows a scenario before the mirror display apparatus of the present disclosure detects a first area in the mirror display unit 101 corresponding to a human body, subfigure (b) schematically shows a scenario after a mirror display apparatus according to the above-described first further exemplary embodiment of the present disclosure has just detected a first area 1011 in the mirror display unit corresponding to a human body (corresponding to the user having arrived in front of the mirror display unit from another location), subfigure (c) schematically shows a scenario where the mirror display apparatus according to the above-described first further exemplary embodiment of the first embodiment has detected moving of the first area 1011 in the mirror display unit corresponding to the human body (corresponding to the user moving in front of the mirror display unit 101), subfigure (d) schematically shows a scenario after the mirror display apparatus according to the above-described second further embodiment of the present disclosure has just detected a first area 1011 in the mirror display unit corresponding to a human body (corresponding to the user having arrived in front of the mirror display unit from another location), and subfigure (e) schematically shows a scenario where the mirror display apparatus according to the above-described second further exemplary embodiment of the first embodiment has detected moving of the first area 1011 in the mirror display unit corresponding to the human body (corresponding to the user moving in front of the mirror display unit 101). FIG. 3B includes five subfigures, (a), (b), (f), (d), (g), where subfigures (a), (b) and (d) are the same as subfigures (a), (b) and (d) in FIG. 3A respectively, subfigure (f) schematically shows a scenario where the mirror display apparatus according to the above-described first further exemplary embodiment of the present disclosure detects that the first area 1011 in the mirror display unit corresponding to the human body becomes larger (corresponding to the user approaching the mirror display unit 101), and subfigure (g) schematically shows a scenario where the mirror display apparatus according to the second further exemplary embodiment of the present disclosure detects that the first area 1011 in the mirror display unit corresponding to the human body becomes larger (corresponding to the user approaching the mirror display unit 101).

As shown in FIG. 3A, before the mirror display apparatus of the present disclosure detects a first area 1011 in the mirror display unit 101 corresponding to a human body (i.e., no user is in front of the mirror display unit 101), the mirror display unit 101 is entirely the second area 1012 for displaying an information image (whose contents are denoted as ABCDE), as shown in the image (a). When the user comes from another location to the front of the mirror display unit 101, the detection unit 102 detects a first area 1011 in the mirror display unit 101 corresponding to the human body of the user, and the processing unit 103 adjusts the position, size and/or shape of the second area 1012 accordingly, such that the second area 1012 is outside the first area 1011. In addition, for the contents "C" of the information image originally displayed in the second area 1012 at the position of the first area 1011, different embodiments of the present disclosure have different processing methods. In the above-described first further exemplary embodiment of the present disclosure, the contents "C" of the information image originally displayed in the second area 1012 at the position of the first area 1011 is transferred to the adjusted second area to continue display, as shown in subfigure (b). In the second further exemplary embodiment of the present disclosure, the display of the contents "C" of the information image originally displayed in the second area 1012 at the position of the first area 1011 is closed, as shown in subfigure (d). When the user moves to a new position in front of the mirror display unit 101, the detection unit 102 detects that the first area 1011 is moved to the new position and the processing unit 103 adjusts the position, size and/or shape of the second area 1012 accordingly, such that the second area 1012 is located outside the first area. Similarly, for the contents "D" of the information image originally in the second area 1012 at the position of the new first area 1011, in the above-described first further exemplary embodiment of the present disclosure, it is transferred to the adjusted second area 1012 to continue display, as shown in subfigure (c); and in the above-described second further exemplary embodiment of the present disclosure, the contents "D" of the information image is hidden, and the display of the contents "C" of the information image originally hidden by the first area 1011 is restored.

As shown in FIG. 3B, when the user comes closer to the mirror display unit 101 in front of the mirror display unit 101, the detection unit 102 detects that the first area 1011 becomes larger and the processing unit 103 adjusts the position, size and/or shape of the second area 1012 accordingly, so that the second area 1012 is located outside the first area. For the contents "C" and "D" of the information image in the second area 1012 originally at the position of the larger first area 1011, in the above-described first further exemplary embodiment of the present disclosure, as shown in subfigure (f), they are transferred to the adjusted second area 1012 to continue display; and in the above-described second further exemplary embodiment of the present disclosure, the display of the contents "C" and "D" of the information image is hidden, as shown in subfigure (g).

According to an exemplary embodiment of the present disclosure, the processing unit 103 may adjust the position, shape and/or size of the second area 1012 in response to the detection of the first area 1011 by the detection unit 102 such that the second areas 1012 occupies the largest space outside the first area 1011. For example, the processing unit 103 may cause the second area 1012 to be a maximum rectangle outside the first area 1011, or may cause the second area 1012 to occupy all of the display space outside of the first area 1011.

According to a further exemplary embodiment of the present disclosure, the processing unit 103 may also adjust the number of second areas 1012 in response to the detection of the first area 1011 by the detection unit 102 such that the second areas 1012 are located outside the first area 1011. For example, the processing unit 103 may divide the second area 1012 into two parts, on both sides of the area corresponding to the body.

According to an exemplary embodiment of the present disclosure, the detection operation of the detection unit 102 and the adjustment operation of the processing unit 103 may be continuously performed. In this way, the position, size and/or shape of the second area 1012 are constantly changing accordingly as the position of the first area 1011 changes as the human body moves in front of the mirror display apparatus, thus bringing a better user experience. For example, with the movement of the human body in front of the mirror display apparatus, the image thereof in the first area moves along, and the position, size and/or shape of the second area are also constantly changing, but always surrounding the first area, resulting in a visual effect of the image of the human body moving in the picture.

The mirror display apparatus according to embodiments of the present disclosure has been described above with reference to the accompanying drawings, and it is to be noted that the above description is by way of example only and is not intended to limit the present disclosure. In other embodiments of the present disclosure, the mirror display apparatus may have more, fewer, or different modules, and the relationships of connection, containment, and function among the modules may be different from those described and illustrated. For example, part of the functions of the detection unit 102, for example, a function for processing a detected signal to determine an area in the mirror display unit 101 corresponding to a human body, may be performed by the processing module 103.

Figure 4:
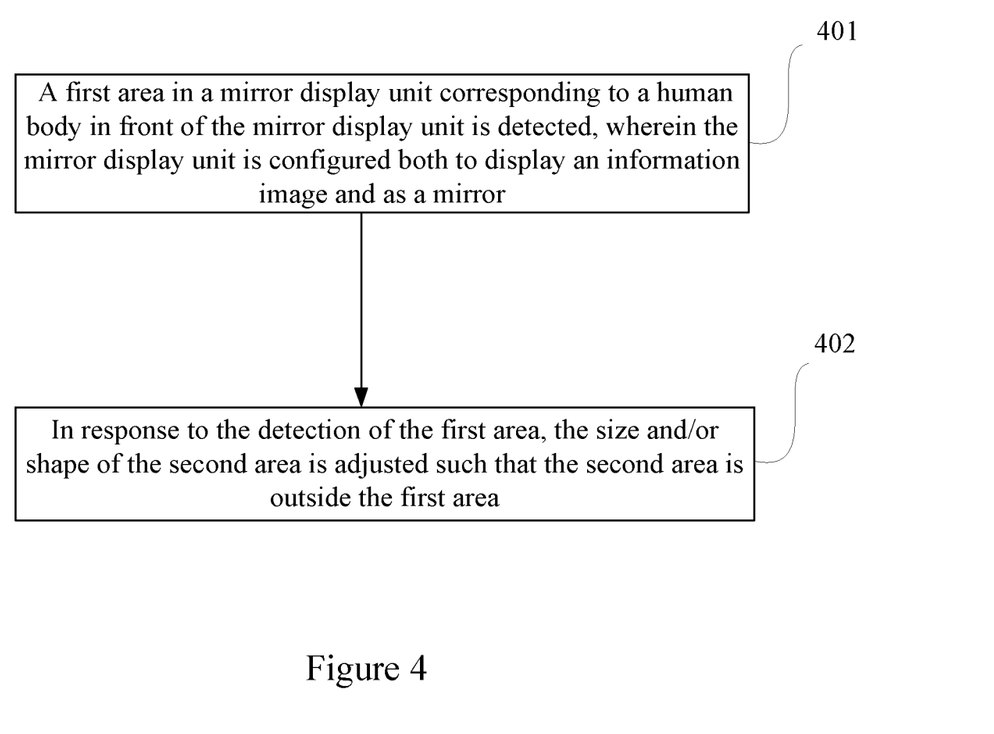
FIG. 4 shows a mirror display method according to an embodiment of the present disclosure.

Referring now to FIG. 4, there is shown a mirror display method according to an embodiment of the present disclosure. The method may be performed by the above-described mirror display apparatus according to an embodiment of the present disclosure. For the sake of brevity, part of the details repeated with the above description are omitted from the following description, and a more detailed understanding of the mirror display method can be obtained by referring to the above description.

As shown in FIG. 4, a mirror display method according to an embodiment of the present disclosure includes the following steps:

In step 401, a first area in a mirror display unit corresponding to a human body in front of the mirror display unit is detected, wherein the mirror display unit can be used both for displaying an information image and as a mirror; and In step 402, in response to the detection of the first area, the position of a second area for displaying an information image in the mirror display unit is adjusted so that the second area is outside the first area.

According to an exemplary embodiment of the present disclosure, the method further comprises:

In said step 402, in response to the detection of the first area, the size and/or shape of the second area is adjusted such that the second area is outside the first area.

According to a further exemplary embodiment of the present disclosure, the method further comprises the following step:

In response to the detection of the first area, the information image originally displayed in the second area at the position of the first area is transferred to the adjusted second area for display, and the first area is caused to be used as a mirror.

According to another further exemplary embodiment of the present disclosure, the method further comprises:

In response to the detection of the first area, the display of the information image originally displayed in the second area at the position of the first area is closed, and the first area is caused to be used as a mirror.

According to an exemplary embodiment of the present disclosure, the adjusting the position, size and/or shape of the second area such that the second area is located outside the first area comprises:

Adjusting the position, size and/or shape of the second area such that the second area surrounds the first area.

According to an exemplary embodiment of the present disclosure, the adjusting the position, size and/or shape of the second area such that the second area is located outside the first area comprises:

Adjusting the position, size and/or shape of the second area in response to the detection of the first area such that the second area occupies a maximum space other than the first area.

According to an exemplary embodiment of the present disclosure, the method further comprises:

In said step 402, in response to the detection of the first area, the number of second areas is adjusted such that the second areas are located outside the first area.

According to an exemplary embodiment of the present disclosure, the detecting step and the adjusting step are continuously performed. In this way, as a human body moves in front of the mirror display apparatus, the position of the first area is constantly changing, and accordingly, the second area is constantly changing, thereby providing a better user experience.

The mirror display method according to embodiments of the present disclosure has been described above with reference to the accompanying drawings, and it should be noted that the above description is merely an example and is not a limitation of the mirror display method of the present disclosure. In other embodiments of the present disclosure, the mirror display method may have more, fewer or different steps, and the relationships of order, inclusion and function among the steps may be different from what has been described and illustrated.

It is to be understood that the above embodiments of the present disclosure are merely exemplary embodiments for explaining the principles of the present disclosure, and the present disclosure is not limited thereto. It will be apparent to those skilled in the art that various changes and modifications can be made therein without departing from the spirit and spirit of the disclosure, which are also intended to be within the scope of the present disclosure. The scope of the disclosure is defined only by the meaning of the language expression of the appended claims and their equivalents.

The invention claimed is:

1. A mirror display apparatus, comprising:
    a mirror display unit configured to display an information image and to reflect a scene as a mirror;
    a detection unit configured to detect a first area for displaying an image of the scene in the mirror display unit corresponding to a human body in front of the mirror display unit; and
    a processing unit configured to adjust a position of a second area for displaying the information image in the mirror display unit in response to the detection of the first area by the detection unit, so the second area including the displayed information image is located outside the first area, the first area configured to increase in size in response to the corresponding human body in front of the mirror display unit approaching the mirror display unit.

2. The mirror display apparatus according to claim 1, wherein the processing unit is further configured to adjust a size and/or shape of the second area in response to the detection of the first area by the detection unit, so the second area including the displayed information image is located outside the first area.

3. The mirror display apparatus according to claim 2, wherein the processing unit is further configured to transfer the information image from an original position in the detected first area to the adjusted second area for display, and to use the first area as the mirror to reflect the scene, in response to the detection of the first area by the detection unit.

4. The mirror display apparatus according to claim 3, wherein the detection unit includes an infrared detection unit and/or a dual camera detection unit.

5. The mirror display apparatus according to claim 2, wherein the processing unit is further configured to close the display of the information image originally displayed at a position in the detected first area, and to use the first area as the mirror to reflect the scene, in response to the detection of the first area by the detection unit.

6. The mirror display apparatus according to claim 5, wherein the detection unit includes an infrared detection unit and/or a dual camera detection unit.

7. The mirror display apparatus of claim 2, wherein the processing unit is further configured to adjust the position, size and/or shape of the second area so the second area surrounds the first area.

8. The mirror display apparatus according to claim 7, wherein the detection unit includes an infrared detection unit and/or a dual camera detection unit.

9. The mirror display apparatus according to claim 2, wherein the processing unit is further configured to adjust the position, size and/or shape of the second area so the second area occupies a maximum space other than the first area.

10. The mirror display apparatus according to claim 2, wherein the detection unit includes an infrared detection unit and/or a dual camera detection unit.

11. The mirror display apparatus according to claim 1, wherein the processing unit is further configured to adjust multiple second areas in response to the detection of the first area by the detection unit, so the multiple second areas are located outside the first area.

12. The mirror display apparatus according to 1, wherein the detection unit includes an infrared detection unit and/or a dual camera detection unit.

13. A method of mirror display, the method comprising:
    detecting a first area for displaying an image of a scene in a mirror display unit corresponding to a human body in front of the mirror display unit, the mirror display unit configured to display an information image and to reflect the scene as a mirror; and
    in response to the detection of the first area, adjusting a position of a second area so the second area including the displayed information image is outside the first area, the first area configured to increase in size in response to the corresponding human body in front of the mirror display unit approaching the mirror display unit.

14. The method according to claim 13, further comprising:
    in response to the detection of the first area, adjusting a size and/or shape of the second area so the second area including the displayed information image is outside the first area.

15. The method according to claim 14, further comprising:
    in response to the detection of the first area, transferring the information image from an original position in the detected first area to the adjusted second area for display, and using the first area as the mirror to reflect the scene.

16. The method according to claim 14, further comprising:
    in response to the detection of the first area, closing the display of the information image originally displayed at a position in the detected first area and using the first area as the mirror to reflect the scene.

17. The method of claim 14, wherein adjusting the position, size and/or shape of the second area comprises:
    adjusting the position, size and/or shape of the second area such that so the second area surrounds the first area.

18. The method of claim 14, wherein adjusting the position, size and/or shape of the second area comprises:
    in response to the detection of the first area, adjusting the position, size and/or shape of the second area so the second area occupies a maximum space other than the first area.

19. The method according to claim 13, further comprising:
    in response to the detection of the first area, adjusting multiple second areas so the multiple second areas are outside the first area.

20. The method according to claim 13, wherein the detecting and the adjusting are continuously performed.

* * * * *